(12) United States Patent
Ueno et al.

(10) Patent No.: US 6,994,836 B2
(45) Date of Patent: Feb. 7, 2006

(54) METHOD OF RECOVERING CHLORINE GAS FROM CALCIUM CHLORIDE

(75) Inventors: Akifumi Ueno, Tenryu (JP); Naoto Azuma, Hamamatsu (JP); Takefumi Kondo, Hamamatsu (JP); Toshimitsu Sukigara, Hamamatsu (JP); Yusaku Sakata, Okayama (JP)

(73) Assignee: President of Shizuoka University, Shizuoka (JP)

( * ) Notice: Subject to any disclaimer, the term of this patent is extended or adjusted under 35 U.S.C. 154(b) by 146 days.

(21) Appl. No.: 10/290,337

(22) Filed: Nov. 8, 2002

(65) Prior Publication Data

US 2004/0042956 A1 Mar. 4, 2004

(30) Foreign Application Priority Data

Aug. 23, 2002 (JP) ........................... 2002-243429

(51) Int. Cl.
*C01B 7/03* (2006.01)

(52) U.S. Cl. ........................ 423/504; 423/639
(58) Field of Classification Search ................ 423/500, 423/502, 504, 639, 635
See application file for complete search history.

(56) References Cited

U.S. PATENT DOCUMENTS

| | | | | |
|---|---|---|---|---|
| 235,820 A | * | 12/1880 | Solvay | 422/129 |
| 316,195 A | * | 4/1885 | Solvay | 423/504 |
| 1,944,738 A | * | 1/1934 | Grebe et al. | 423/504 |
| 2,413,292 A | * | 12/1946 | Christensen | 423/481 |
| 4,073,875 A | * | 2/1978 | Feilchenfeld | 423/504 |
| 4,803,065 A | | 2/1989 | Itoh et al. | |
| 4,822,589 A | | 4/1989 | Kiyoura et al. | |
| 4,994,256 A | | 2/1991 | Minet et al. | |
| 5,154,911 A | | 10/1992 | Benson et al. | |
| 5,678,244 A | * | 10/1997 | Shaw et al. | 588/201 |

FOREIGN PATENT DOCUMENTS

| | | |
|---|---|---|
| CA | 1112425 | 11/1981 |
| EP | 0 936 184 | 8/1999 |

* cited by examiner

*Primary Examiner*—Ngoc-Yen Nguyen
(74) *Attorney, Agent, or Firm*—Oblon, Spivak, McClelland, Maier & Neustadt, P.C.

(57) ABSTRACT

There is disclosed a method of recovering chlorine gas from calcium chloride comprising the steps of introducing calcium chloride into a heat-resistant vessel which is provided with a gas inlet pipe and a gas outlet pipe, heating the calcium chloride up to at least the melting point thereof while introducing an inert gas from the gas inlet pipe into the vessel to produce fused salt of calcium chloride, and heating the interior of the vessel up to at least 1073K and switching a gas to be introduced from the gas inlet pipe from the inert gas to oxygen to allow the fused salt of calcium chloride to react with the oxygen to obtain chlorine gas and calcium oxide, the chlorine gas being subsequently rapidly and continuously discharged from the vessel through the gas outlet pipe.

10 Claims, 12 Drawing Sheets

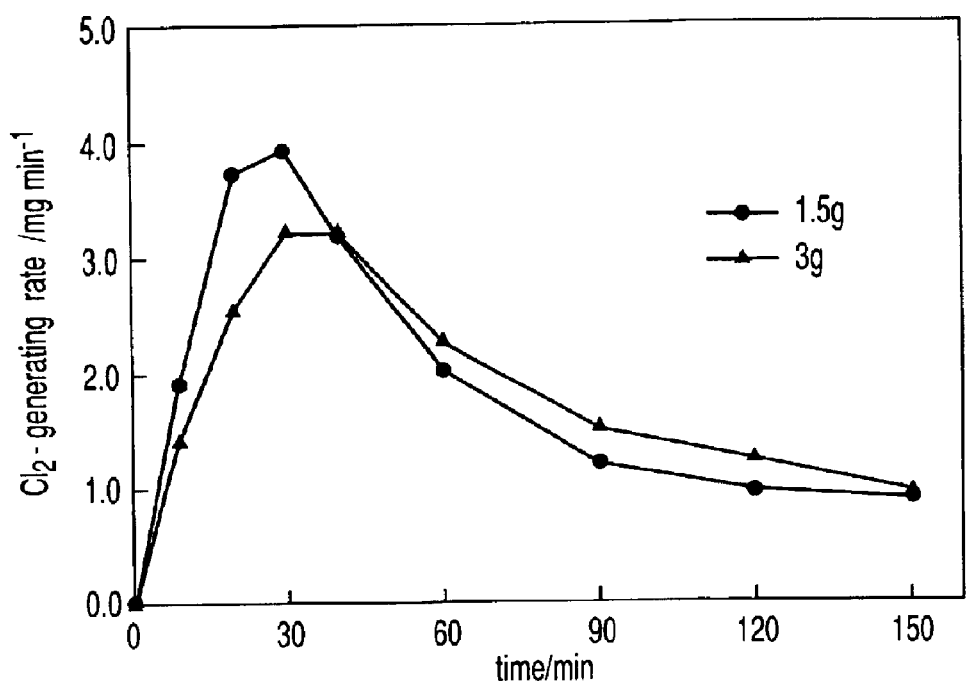
F I G. 9
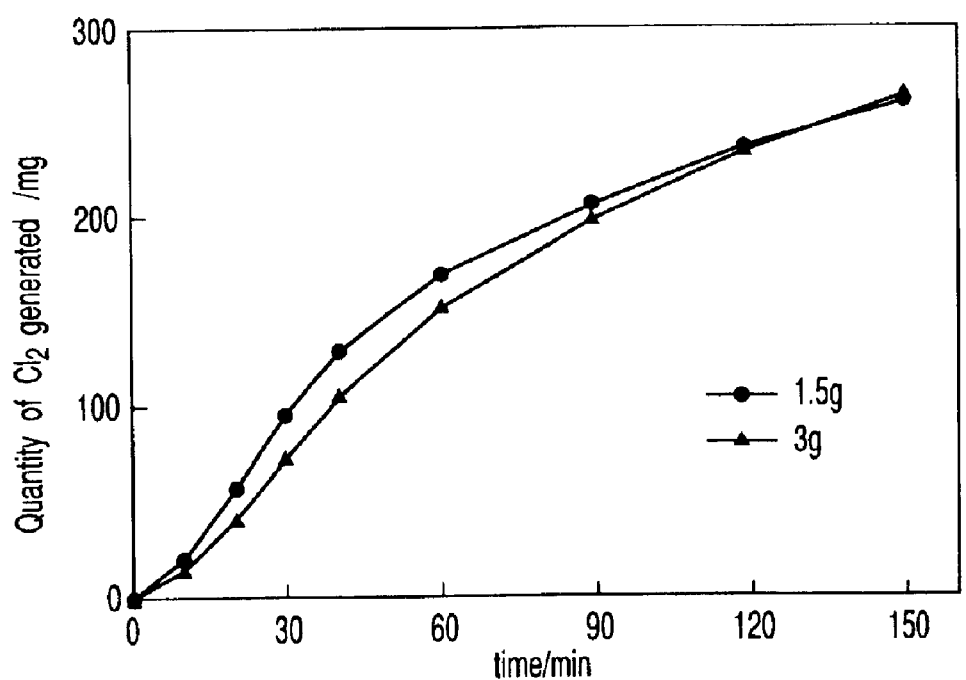
F I G. 10

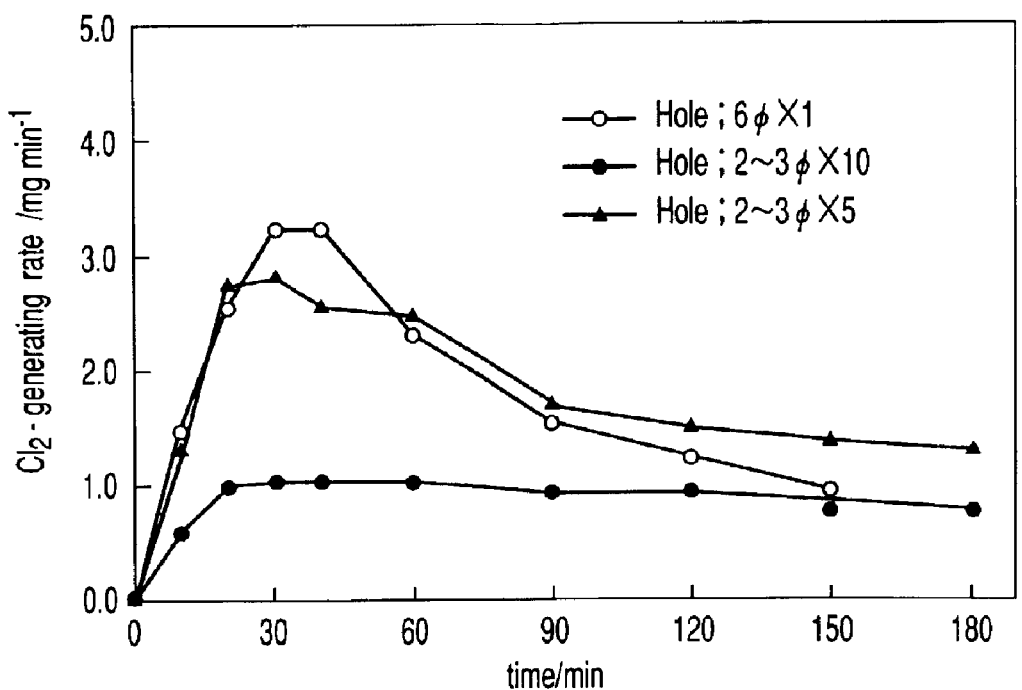
F I G. 21
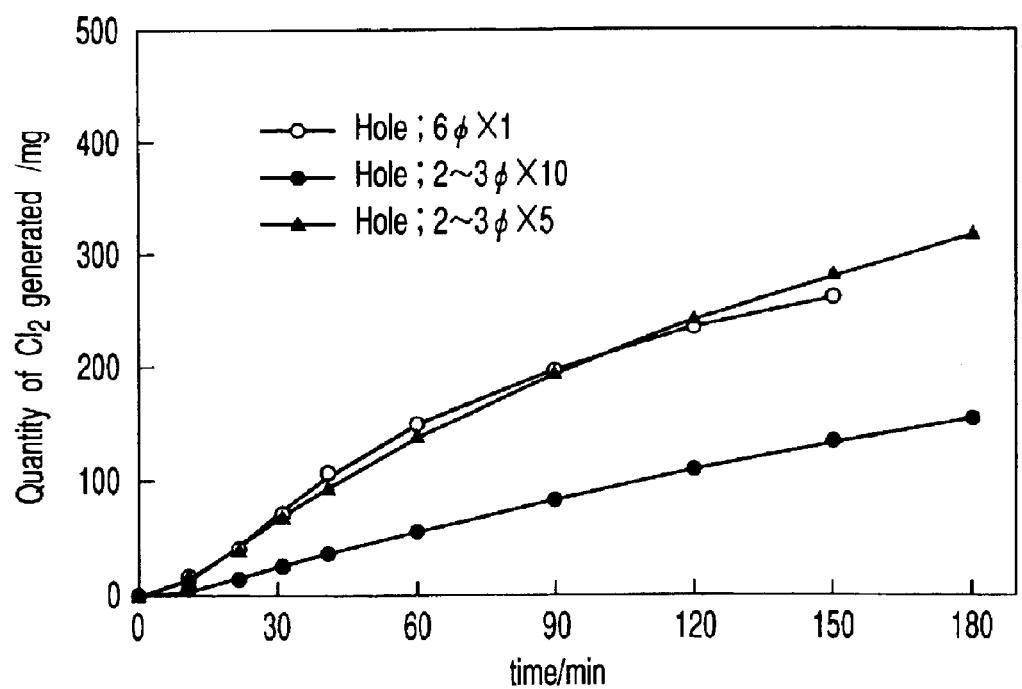
F I G. 22

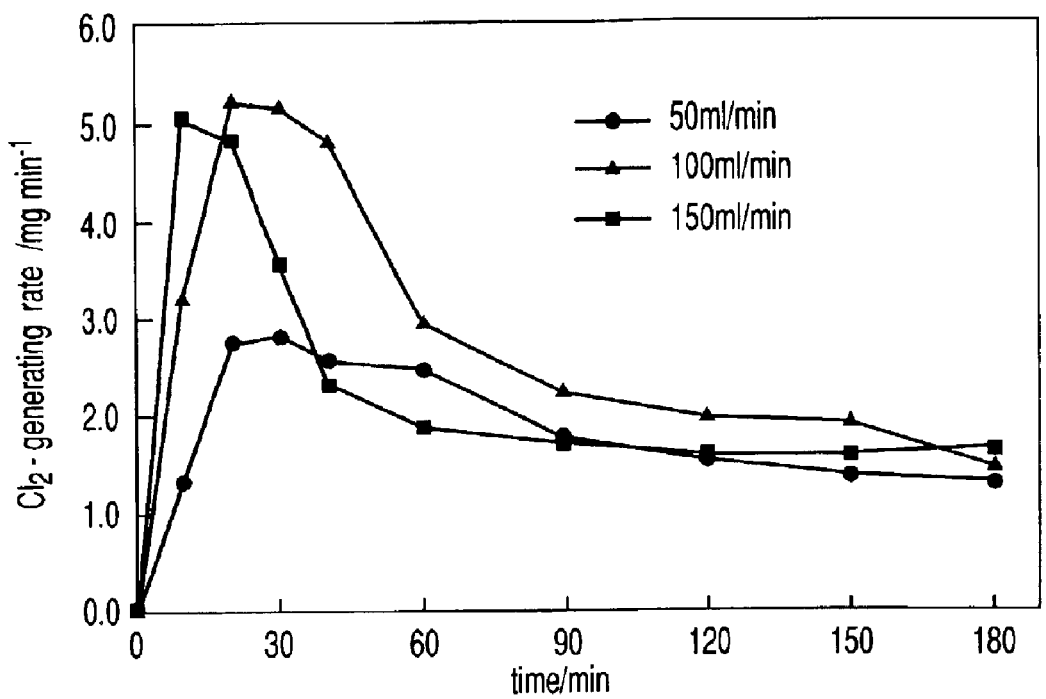
F I G. 23
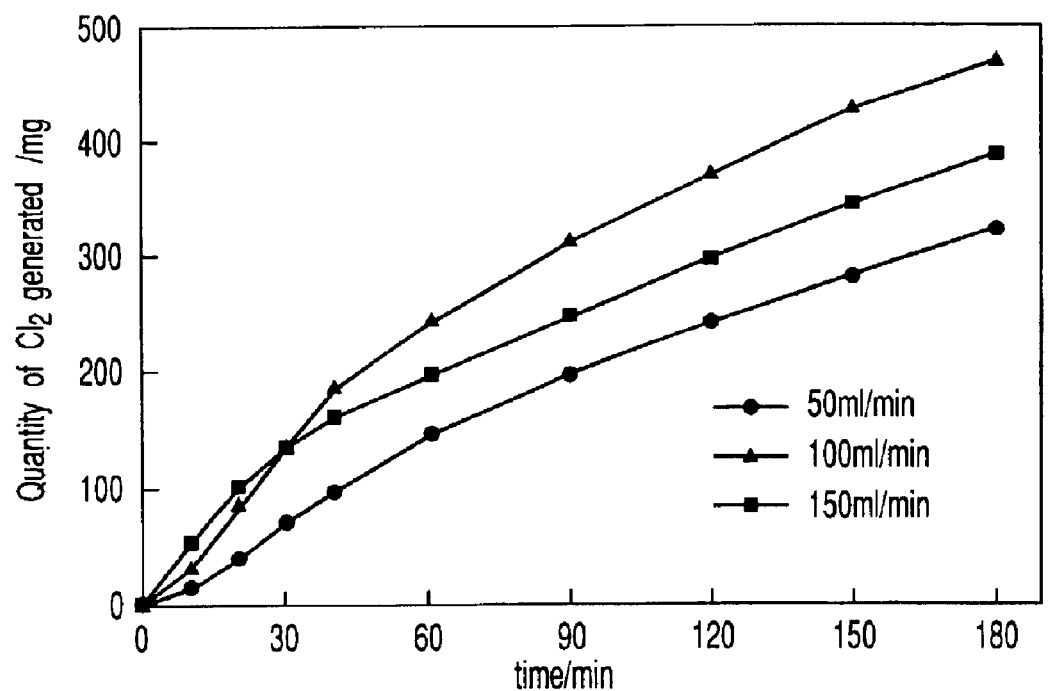
F I G. 24

METHOD OF RECOVERING CHLORINE GAS FROM CALCIUM CHLORIDE

CROSS-REFERENCE TO RELATED APPLICATIONS

This application is based upon and claims the benefit of priority from the prior Japanese Patent Application No. 2002-243429 filed on Aug. 23, 2002, the entire contents of which are incorporated herein by reference.

BACKGROUND OF THE INVENTION

1. Field of the Invention

This invention relates to a method of recovering chlorine gas, and in particular, to a method of recovering chlorine gas from calcium chloride.

2. Description of the Related Art

Since the mass production of plastic leads to the increased consumption and increased waste of plastic, it is feared that the disposal of waste plastic may badly affect the environment. In particular, since polyvinyl chloride contains a large quantity of chlorine, the environmental safety thereof now becomes a serious problem. Recently, new regulations called "Regulations On polychlorinated-dibenzo-p-dioxins (PCDDs)" have been enforced wherein it is stipulated, for the purpose of suppressing the generation of dioxin, to set the temperature of a garbage incinerator to not less than 800° C. and to perform the incineration of polyvinyl chloride in the presence of a sufficient quantity of oxygen gas and under the condition wherein the residence time of decomposed gases is set to not less than three seconds. However, even if the generation of organic chlorine compounds such as dioxin can be suppressed by this new regulation, the discharge of inorganic chlorine compounds (hydrogen chloride) would be increased in proportion to the reduction of the organic chlorine compounds. Therefore, it is now desired to develop a technique for safely and economically processing hydrogen chloride.

Meanwhile, even in a chemical plant where phosgene is employed as a raw material, a large quantity of hydrogen chloride is generated. For example, in the synthesizing process of methylene diisocyanate (MDI) or toluene diisocyanate (TDI), which are useful as raw materials for the production of polyurethane as well as in the synthesizing process of polycarbonate (PC) from bisphenol, a large quantity of hydrogen chloride is generated as phosgene is employed as a raw material in these synthesizing processes. Under the circumstances, attempts are now being made to recover chlorine gas from hydrogen chloride generated in this manner so as to recycle chlorine for the production of phosgene. For example, it is reported that it is possible, through the reaction of hydrogen chloride with oxygen in the presence of a chromium oxide catalyst supported by a silica, to recover 70% of hydrogen chloride as chlorine gas (U.S. Pat. Nos. 4,822,589 and 4,803,065). Further, European Patent No. 936184A2 describes that it is possible, through the employment of a ruthenium oxide catalyst supported by a titania, to recover 90% of hydrogen chloride as chlorine gas. Even in the United States of America, a consortium is organized with Air Products Co. being a leading member to engage in the recovery of chlorine gas from hydrogen chloride. The method now being studied in the United States of America is called the Catalyst Carrier Process (CCP) method, wherein a pair of reaction columns are employed to recover chlorine gas from hydrogen chloride. In this case, the first reaction column is employed for generating copper chloride through the reaction between hydrogen chloride and copper oxide. The resultant copper chloride is then transferred, by a riser, to the second reaction column wherein the copper chloride is allowed to react with oxygen gas blown therein from a lower portion of the second reaction column to produce copper oxide concurrent with the production of chlorine gas, thus recovering chlorine gas (U.S. Pat. Nos. 4,994,256 and 5,154,911).

The above-mentioned chlorine gas-recovery methods however are all directed to high-purity hydrogen chloride (99% or more in purity) which will be by-produced from a chemical plant. Since the concentration of hydrogen chloride in the exhaust gas from an incinerator is about 1% at most, these conventional chlorine gas-recovery methods cannot be used for the recovery of chlorine gas from the exhaust gas of an incinerator.

Currently, the exhaust gas from an incinerator is sprayed with a slurry-like aqueous solution of slaked lime ($Ca(OH)_2$) or with quicklime ($CaO$) fine powder to immobilize chlorine as calcium chloride ($CaCl_2$), which is then buried in the ground, thus disposing of the calcium chloride. This calcium chloride itself is designated as a specially controlled waste, so that the cost for burying calcium chloride is relatively high, and moreover, this disposed method is not necessarily safe.

If a suitable method of recovering chlorine from calcium chloride can be found, it is no longer necessary to bury calcium chloride in the ground, and at the same time, the chlorine that is recovered can be effectively recycled as a resource.

BRIEF SUMMARY OF THE INVENTION

Therefore, an object of the present invention is to provide a method of recovering chlorine gas from calcium chloride.

According to one aspect of the present invention, there is provided a method of recovering chlorine gas from calcium chloride comprising:

introducing calcium chloride into a heat-resistant vessel which is provided with a gas inlet pipe and a gas outlet pipe; and heating the calcium chloride up to 1073K or more while introducing air through the gas inlet pipe into the vessel to produce fused salt of calcium chloride which is then allowed to react with oxygen in the air to obtain chlorine gas and calcium oxide, the chlorine gas being subsequently rapidly and continuously discharged from the vessel through the gas outlet pipe.

According to another aspect of the present invention, there is provided a method of recovering chlorine gas from calcium chloride comprising:

introducing calcium chloride into a heat-resistant vessel which is provided with a gas inlet pipe and a gas outlet pipe;

heating the calcium chloride up to a temperature not lower than the melting point thereof while introducing an inert gas through the gas inlet pipe into the vessel to produce fused salt of calcium chloride; and heating the interior of the vessel up to 1073K or more and switching the gas being introduced through the gas inlet pipe from the inert gas to oxygen to allow the fused salt of calcium chloride to react with the oxygen to obtain chlorine gas and calcium oxide, the chlorine gas being subsequently rapidly and continuously discharged from the vessel through the gas outlet pipe.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 9 is a graph illustrating the influence of the quantity of $CaCl_2$ charged on the quantity of chlorine gas generated per unit time;

FIG. 10 is a graph illustrating the influence of the quantity of $CaCl_2$ charged on the total quantity of chlorine gas generated;

FIG. 21 is a graph illustrating the influence of the size and number of oxygen gas bubbles on the quantity of chlorine gas generated per unit time;

FIG. 22 is a graph illustrating the influence of the size and number of oxygen gas bubbles on the total quantity of chlorine gas generated;

FIG. 23 is a graph illustrating the dependency of the quantity of chlorine gas generated per unit time on the flow rate of oxygen; and FIG. 24 is a graph illustrating the dependency of the total quantity of chlorine gas generated on the flow rate of oxygen.

DETAILED DESCRIPTION OF THE INVENTION

Figure 1:
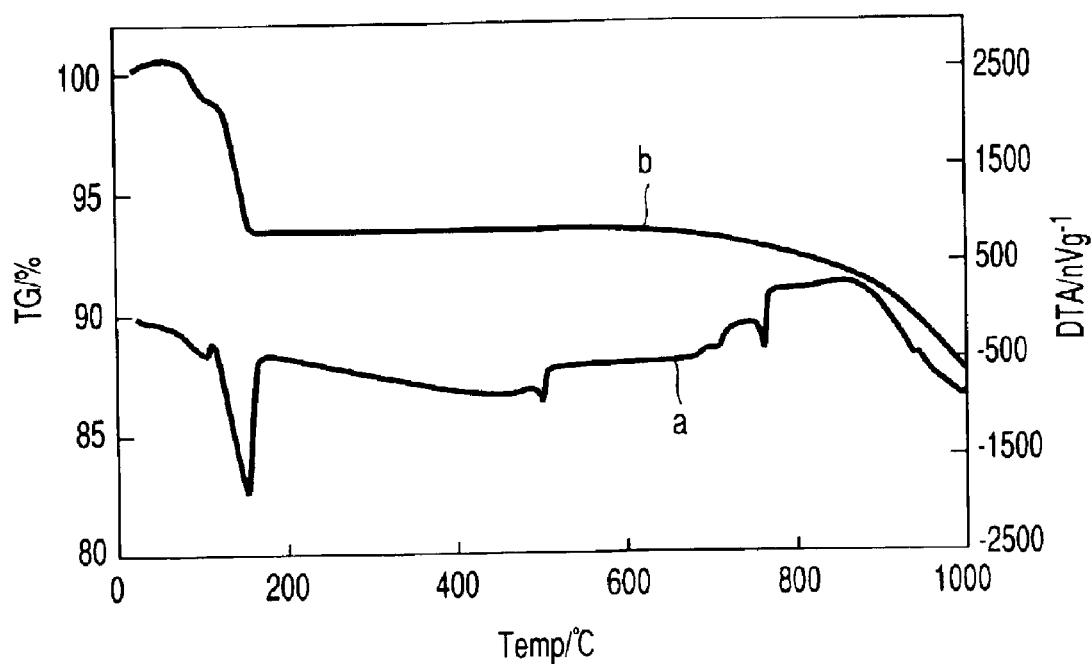
FIG. 1 is a graph illustrating the results of TG/DTA measurements of calcium chloride.

Next, specific embodiments of the present invention will be explained.

As described above, for the purpose of immobilizing chlorine of hydrogen chloride included in the exhaust gas of an incinerator, the exhaust gas is commonly sprayed with a slurry-like slaked lime or with quicklime fine powder to transform chlorine into calcium chloride. Accordingly, the present inventors have studied the calcium chloride generated by these processes and succeeded in discovering a method of recovering chlorine gas from this calcium chloride.

For example, a chlorine-immobilizing reaction by using calcium hydroxide (slaked lime) will proceed according to the following reaction formula (1). Further, the chlorine gas-producing reaction between calcium and oxygen can be represented by the following reaction formula (2).

$$Ca(OH)_2 + 2HCl = CaCl_2 + 2H_2O \qquad (1)$$

$$CaCl_2 + \tfrac{1}{2}O_2 = CaO + Cl_2 \qquad (2)$$

The reaction represented by reaction formula (2) is an endothermic reaction, wherein the equilibrium constant K therein is as low as about $6 \times 10^{-6}$ even at around 1100K, which is higher than the melting point (762° C.) of calcium chloride. Therefore, the reaction between calcium chloride and oxygen can rarely proceed from a thermodynamic viewpoint. It is however possible, by accelerating the reaction rate until the reaction matures to equilibrium, to enhance the rate of recovering chlorine gas from calcium chloride. At a temperature lower than the melting point of calcium chloride, the reaction represented by reaction formula (2) can proceed only at the surface of a solid body. In this case, the diffusion of chlorine ions, which is directed from the interior of the solid body (calcium chloride) to the surface thereof, or the diffusion of oxygen ions, which is directed from the surface of the solid body to the interior thereof, becomes a rate-determining factor. Accordingly, the rate of generating chlorine gas is relatively low and the time required for reaching equilibrium is relatively long. Moreover, under the condition of solid state, the factor which contributes to the reaction of generating chlorine gas is only the calcium chloride existing on the surface region of the solid body.

In the meantime, since calcium chloride is fused to become liquid as it is heated up to not lower than 762° C., it is possible to disregard the diffusion process inside the solid body of chlorine ions or oxygen ions. Furthermore, when calcium chloride is turned into a fused salt, not only the calcium chloride molecule existing on the surface region, but also all of the calcium chloride molecules existing other than the surface region is enabled to take part in the reaction, thereby accelerating the rate of generating chlorine gas. Therefore, it is possible to considerably shorten the time required to reach equilibrium in reaction formula (2). Furthermore, it is possible, through the removal of chlorine gas generated in this manner from the system, to constantly promote the reaction represented by reaction formula (2).

Based on the aforementioned findings, calcium chloride in a fused state is dealt with in the present invention to make it possible to effectively recover chlorine gas from calcium chloride.

The present invention will be further explained with reference to the following examples.

First of all, by using 2 mg of calcium chloride hexahydrate ($CaCl_2 \cdot 6H_2O$) available in the market, the thermal behavior of calcium chloride was investigated. The differential thermal analysis·thermogravimetric analysis (DTA/TG) of calcium chloride were performed in He gas atmosphere at temperatures ranging from room temperature to 1,000° C., the results obtained being shown in the graph of FIG. 1. In FIG. 1, the curve "a" represents the results of measurement on DTA, while the curve "b" represents the results of measurement on TG.

As shown by the curve "a", endothermic peaks due to the dissociation (dehydration) of crystal water were recognized at 101° C. and at 161° C. The endothermic peak which can be observed at around 762° C. was caused by the fusion of calcium chloride, and concomitant with this fusion, a slight decrease in weight due to the evaporation of calcium chloride was also observed. It is quite clear from the curve "b" that when the calcium chloride hydrate was heated up to 200° C. or more, calcium chloride anhydrate was caused to generate. At the same time, it was confirmed that when this calcium chloride anhydrate was heated higher than 762° C., it was caused to melt.

As explained above, the reaction for generating chlorine gas from calcium chloride can be represented by the following reaction formula:

$$CaCl_2 + \tfrac{1}{2}O_2 = CaO + Cl_2 \qquad (2)$$

With a view to determining the thermodynamic behavior of this reaction, thermodynamic equilibrium values (K) were calculated by using Gibbs free energy (G) of $CaCl_2$, $CaO$, $O_2$ and $Cl_2$ at temperatures ranging from 298K to 1500K, the results being summarized in Table 1.

TABLE 1

| Temp (K) | G (kcal/mol) | | | | ΔG (kcal/mol) | K (atm$^{-1}$) | ln (K) |
|---|---|---|---|---|---|---|---|
| | $CaCl_2$ | $O_2$ | $CaO$ | $Cl_2$ | | | |
| 298 | −199.510 | −14.611 | −154.432 | −15.891 | 36.493 | $1.726 \times 10^{-27}$ | −61.624 |
| 300 | −199.560 | −14.702 | −154.450 | −15.990 | 36.471 | $2.699 \times 10^{-27}$ | −61.177 |
| 400 | −202.557 | −19.714 | −155.568 | −21.449 | 35.397 | $4.573 \times 10^{-20}$ | −44.532 |
| 500 | −206.008 | −24.910 | −156.968 | −27.120 | 34.375 | $9.438 \times 10^{-16}$ | −34.597 |
| 600 | −209.830 | −30.257 | −158.604 | −32.963 | 33.392 | $6.876 \times 10^{-13}$ | −28.006 |
| 700 | −213.968 | 35.733 | −160.441 | −38.952 | 32.442 | $7.438 \times 10^{-11}$ | −23.322 |
| 800 | −278.380 | −41.319 | −162.455 | −45.065 | 31.520 | $2.451 \times 10^{-9}$ | −19.827 |
| 900 | −223.037 | −47.005 | −164.624 | −51.288 | 30.628 | $3.654 \times 10^{-8}$ | −17.125 |
| 1000 | −227.915 | −52.780 | −166.935 | −57.610 | 29.760 | $3.134 \times 10^{-7}$ | −14.976 |
| 1100 | −233.359 | −58.636 | −169.373 | −64.019 | 29.285 | $1.519 \times 10^{-6}$ | −13.392 |
| 1200 | −239.316 | −64.567 | −171.928 | −70.509 | 29.163 | $4.885 \times 10^{-6}$ | −12.229 |
| 1300 | −245.479 | −70.568 | −174.593 | −77.072 | 29.098 | $1.283 \times 10^{-5}$ | −11.264 |
| 1400 | −251.833 | −76.633 | −177.358 | −83.704 | 29.088 | $2.879 \times 10^{-5}$ | −10.455 |
| 1500 | −258.363 | −82.760 | −180.219 | −90.399 | 29.125 | $5.709 \times 10^{-5}$ | −9.771 |

As shown in Table 1, since the Gibbs free energy change (ΔG) is positive at temperatures ranging from 298K to 1,500K, the reaction represented by the aforementioned reaction formula (2) can rarely proceed from a thermodynamic viewpoint. As the reaction temperature is raised, the equilibrium value (K) is also caused to increase, and when the reaction temperature is raised beyond the melting point of calcium chloride, the equilibrium value (K) is increased up to about $1.5 \times 10^{-6}$. It is suggested from this fact that when calcium chloride is heated to a temperature not less than the melting point thereof, an observable quantity of chlorine gas (of the order of ppm or more) is permitted to exist in the gas phase. Therefore, if the chlorine gas generated in this reaction can be removed rapidly and continuously from the reaction system, the reaction of generating chlorine gas from calcium chloride can be constantly promoted.

Figure 2:
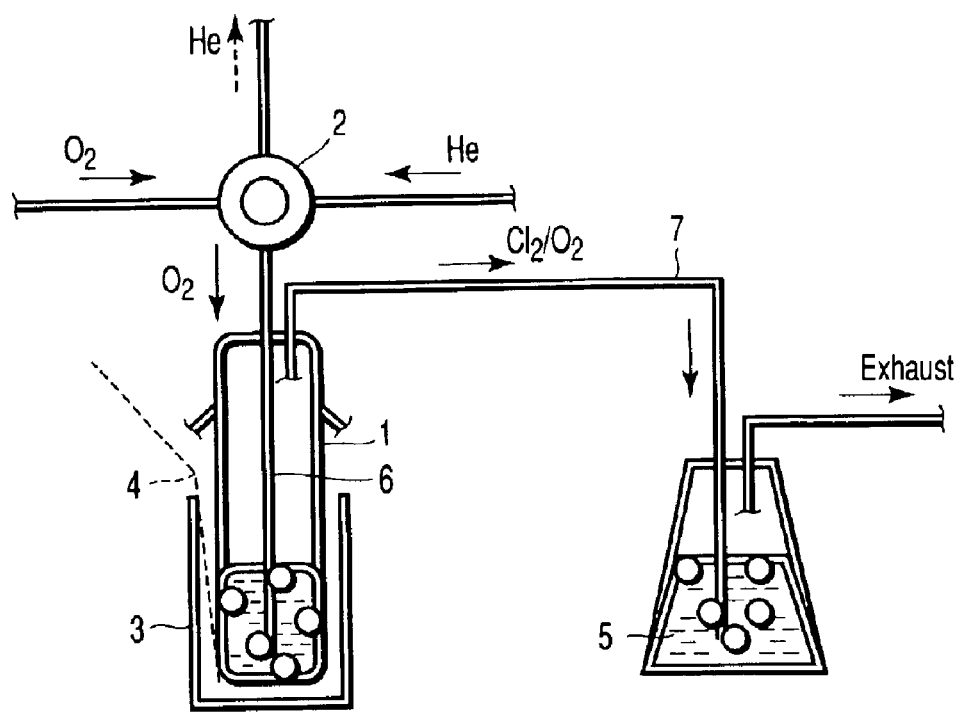
FIG. 2 schematically illustrates a reactor employed in examples.

FIG. 2 schematically shows one example of the reactor that can be employed for the recovery of chlorine gas from calcium chloride.

As shown in FIG. 2, this reactor is constituted by a quartz reaction tube 1 into which a gas inlet quartz tube 6 (6 mm in inner diameter) is inserted, an inlet gas switching four-way cock 2, a heater 3, a thermocouple 4, and a chlorine gas trapping KI aqueous solution 5. In the operation of this reactor, calcium chloride is placed in the quartz reaction tube 1 and heated up to not less than melting point of calcium chloride (762° C.) while introducing He gas as an inert gas from the gas inlet quartz tube 6, thereby forming a fused salt of calcium chloride. Incidentally, the inert gas to be introduced in this case may not be limited to He gas but may be any other kinds of inert gases such as Ar gas or $N_2$ gas. After the fused salt has been formed, the inlet gas switching four-way cock 2 is operated to switch the inlet gas from He gas to oxygen gas, and the heating temperature is raised to 800° C. or more to enable the fused salt of calcium chloride to react with oxygen to produce chlorine gas together with calcium oxide. The flow rate of oxygen gas can be suitably selected depending on the size of the inner diameter of the gas inlet tube. When the gas inlet tube employed is 6 mm in inner diameter, the flow rate of oxygen gas should preferably be within the range of 30 mL/min to 75 mL/min.

Incidentally, it has been discovered by the present inventors that in order to enable the fused salt of calcium chloride to excellently react with oxygen, the calcium chloride is required to be heated to 800° C. or more. On this occasion, in order to prevent the calcium oxide thus produced from being fused, the heating temperature should preferably be limited to less than the melting point of the calcium oxide.

As an alternative embodiment, the inlet gas switching four-way cock 2 may be omitted, and calcium chloride inside the quartz reaction tube 1 may be heated while constantly introducing air therein from the gas inlet tube 6. When the heating temperature is raised beyond the melting point of calcium chloride, a fused salt thereof is generated, and when the heating temperature is raised beyond 800° C., the oxygen in the air is allowed to react with the fused salt of calcium chloride to produce chlorine gas and calcium oxide. As already explained, when oxygen gas is introduced via the gas inlet tube having an inner diameter of 6 mm into the reactor, the flow rate of oxygen gas should preferably be within the range of 30 mL/min to 75 mL/min. On the other hand, when air is introduced in place of oxygen gas by a gas inlet tube having a similar structure to that described above, the flow rate of air should assumably be controlled to such as described below. Since the content of oxygen in air is about 20 mol % as is commonly known, if it is desired to introduce air by using a gas inlet tube having the same inner diameter as described above, the flow rate of air should be made five times as high as the aforementioned flow rate of oxygen gas, thereby making it possible to supply almost the same quantity of oxygen as described above.

It is possible, through the adjustment of the length of the gas inlet tube 6, to blow oxygen gas into a desired region of the fused salt of calcium chloride. For example, when this gas inlet tube 6 is short, the oxygen gas can be blown to only the surface of the fused salt of calcium chloride. On the other hand, when this gas inlet tube 6 is suitably elongated, the oxygen gas can be blown into the interior of the fused salt of calcium chloride, thus enabling the fused salt of calcium chloride to be sufficiently agitated and enhancing the gas-liquid contact.

The chlorine gas generated by this reaction is allowed to react with KI in the KI aqueous solution 5 to dissociate iodine ($I_2$). This iodine is subsequently quantitatively analyzed to calculate the quantity of chlorine gas captured by the aqueous solution 5. In this quantitative analysis, colorimetry by a spectrophotometer can be used together with chemical analysis by titration using sodium thiosulfate where starch is employed as an indicator.

EXAMPLE 1

1.5 g of calcium chloride was introduced into the reaction tube 1 of the reactor shown in FIG. 2 and heated up to 200° C. in an He gas flow introduced therein at a flow rate of 50 mL/min. The calcium chloride was heated at this temperature for 30 minutes to remove water content in the sample. The calcium chloride was further heated up to a predetermined temperature, and after the confirmation of this predetermined temperature, the four-way cock was manipulated to switch the inlet gas from He to oxygen gas (50 mL/min) so as to initiate the reaction.

Figure 3:
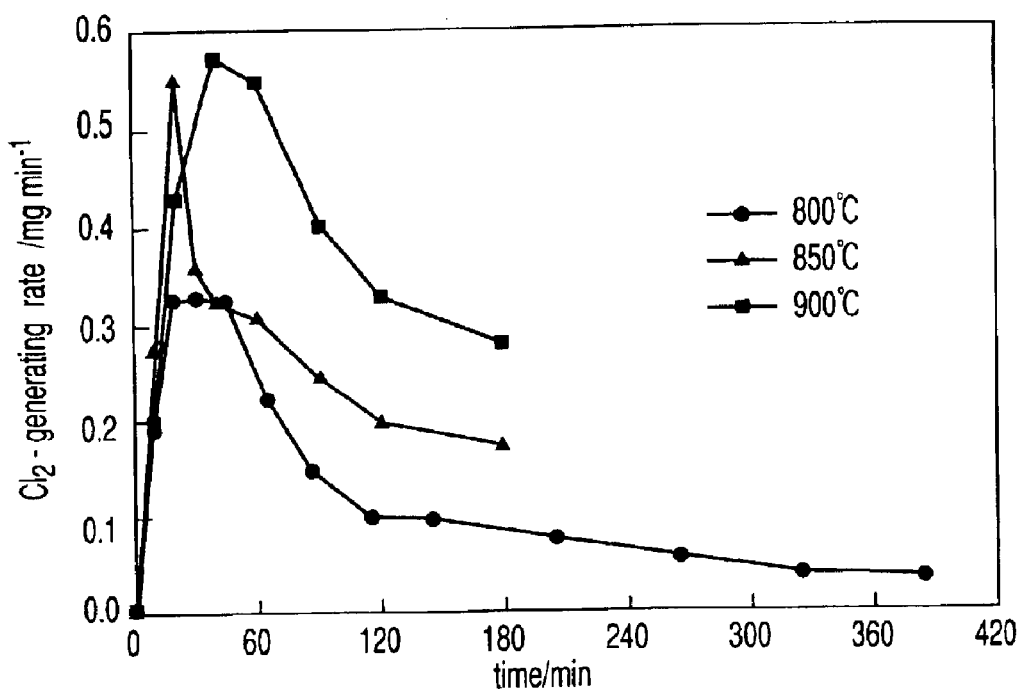
FIG. 3 is a graph illustrating the reaction temperature dependency of the quantity of chlorine gas generated per unit time.
Figure 4:
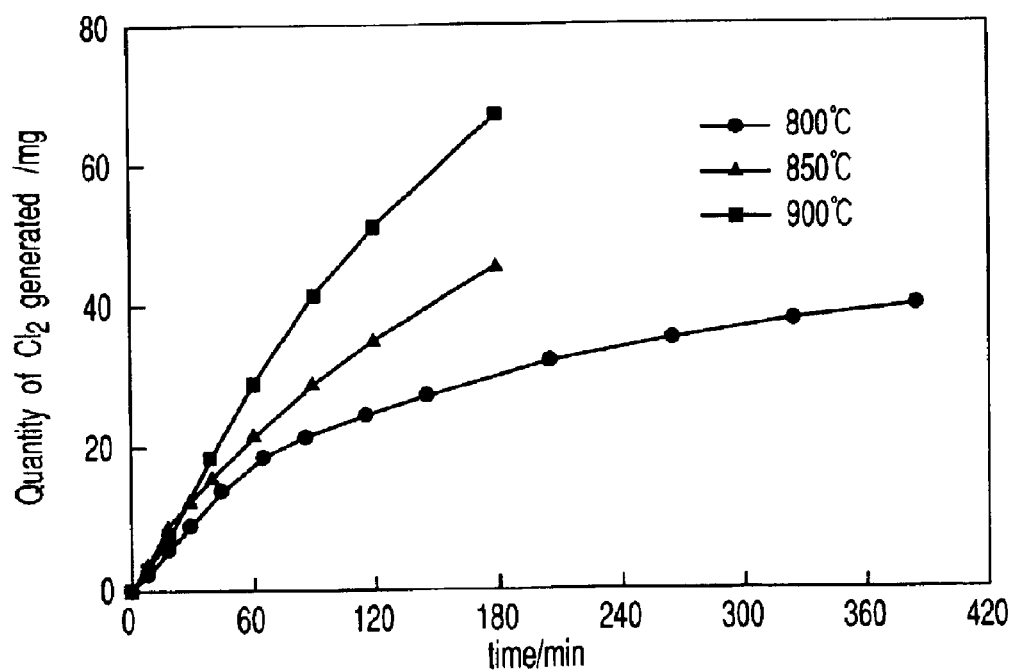
FIG. 4 is a graph illustrating the reaction temperature dependency of the total quantity of chlorine gas.

In this case, the gas inlet tube 6 was shortened so as to enable the oxygen gas to be blown only to the surface of the fused salt of calcium chloride. This experiment was performed by setting the reaction temperature to 800° C., 850° C. and 900° C. The KI aqueous solution 5 for entrapping chlorine gas was exchanged every predetermined period of time so as to analyze, by colorimetry and titrimetric method, a quantity of chlorine gas which was generated during the aforementioned predetermined period of time. The graph of FIG. 3 shows a quantity of chlorine gas generated per unit time, and the graph of FIG. 4 shows a total quantity of chlorine gas generated in this case. A total quantity of chlorine gas generated was calculated by integrating the results shown in FIG. 3. It was confirmed from FIG. 4 that as the reaction temperature became higher, the rate of generating chlorine gas was further accelerated.

As shown in FIG. 3, a quantity of chlorine gas generated was constant up to 60 minutes after the initiation of the reaction, but was considerably deteriorated after the time exceeding over 60 minutes of reaction. The reason for this phenomenon is assumed to be attributed to the formation of film-like calcium oxide on the surface of the fused salt of calcium chloride, thus preventing the fused salt of calcium chloride from being contacted with the oxygen gas.

EXAMPLE 2

In this example, the reactor shown in FIG. 2 was modified such that the gas inlet tube 6 was elongated so as to enable oxygen gas to blown into the interior of the fused salt of calcium chloride. The same procedures as described in Example 1 were repeated except that this modified reactor was employed, thereby allowing chlorine gas to generate by heating 1.5 g of calcium chloride up to 900° C., a quantity of the chlorine gas thus generated was measured by the same procedures as described above.

Figure 5:
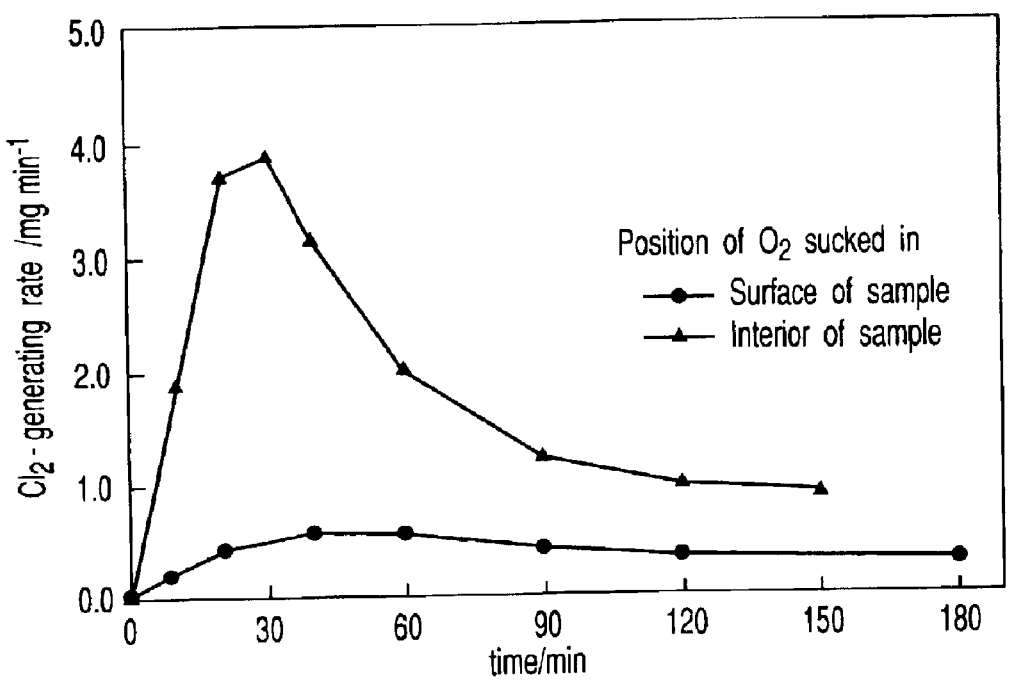
FIG. 5 is a graph illustrating the influence of the position of blowing oxygen on the quantity of chlorine gas generated per unit time.
Figure 6:
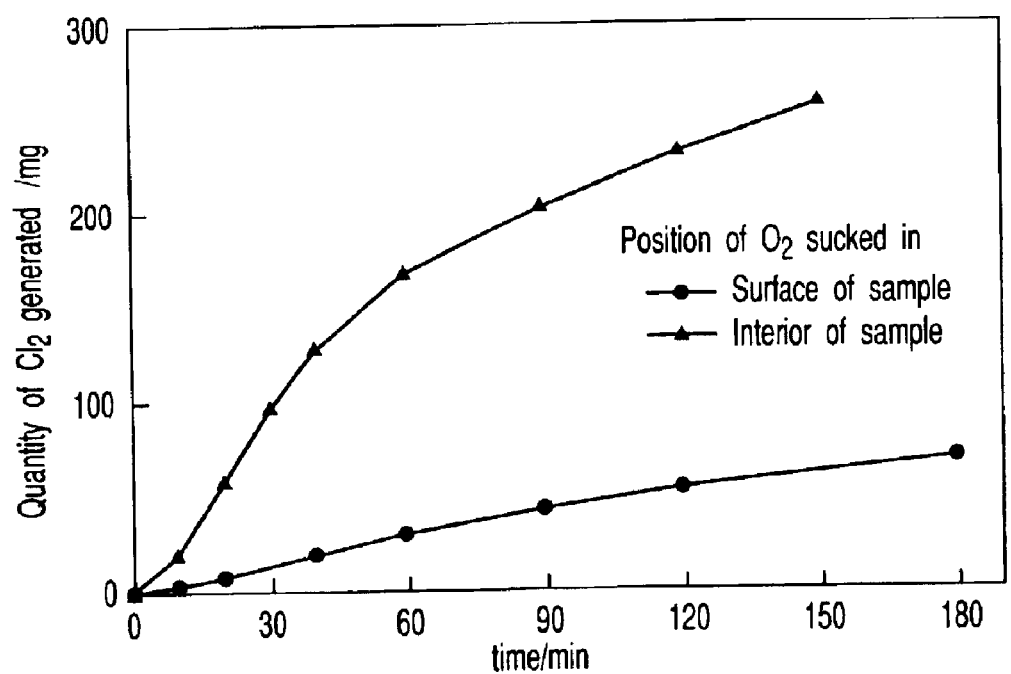
FIG. 6 is a graph illustrating the influence of the position of blowing oxygen on the total quantity of chlorine gas generated.

The graph of FIG. 5 shows a quantity of chlorine gas generated per unit time, and the graph of FIG. 6 shows a total quantity of chlorine gas generated in this case. These graphs also show the results obtained when oxygen was blown onto only the surface of the fused salt of calcium chloride (900° C. of Example 1).

It was confirmed from the results shown in FIGS. 5 and 6 that the rate of generating chlorine gas could be accelerated by blowing oxygen gas into the interior of the fused salt of calcium chloride so as to enhance the fused salt-agitating effect, thus enabling the fused salt of calcium chloride to sufficiently contact the oxygen gas. Stoichiometrically speaking, it is possible to generate 900 mg of chlorine gas from 1.5 g of calcium chloride. FIG. 6 shows that by blowing oxygen gas into the interior of the fused salt of calcium chloride, 100 mg of chlorine gas was generated within 30 minutes, and 170 mg of chlorine gas was generated within one hour. These quantities correspond to 11% and 19%, respectively, of the theoretical quantity of generated chlorine gas.

As shown in FIG. 5, even if oxygen gas was blown into the interior of the fused salt of calcium chloride, the rate of generating chlorine gas was sharply deteriorated after the lapse of 50 minutes of the reaction period. It is assumed that the reason for this can be attributed to the fact that the fine particles of calcium oxide that had been generated from the reaction were allowed to float in the fused salt of calcium chloride, thereby preventing the fused salt of calcium chloride from contacting the oxygen.

EXAMPLE 3

In this example, by using the gas inlet tube 6 which was elongated in the same manner as in Example 2, 1.5 g of calcium chloride was heated up to 900° C. to generate chlorine gas, which was then measured by the same procedures as described above. In this case, the oxygen gas was blown into the fused salt of calcium chloride at three different flow rates, i.e. 30 mL/min, 50 mL/min and 75 mL/min. By varying the flow rate of oxygen gas, a quantity of chlorine gas to be taken out of the reaction system was caused to vary.

Figure 7:
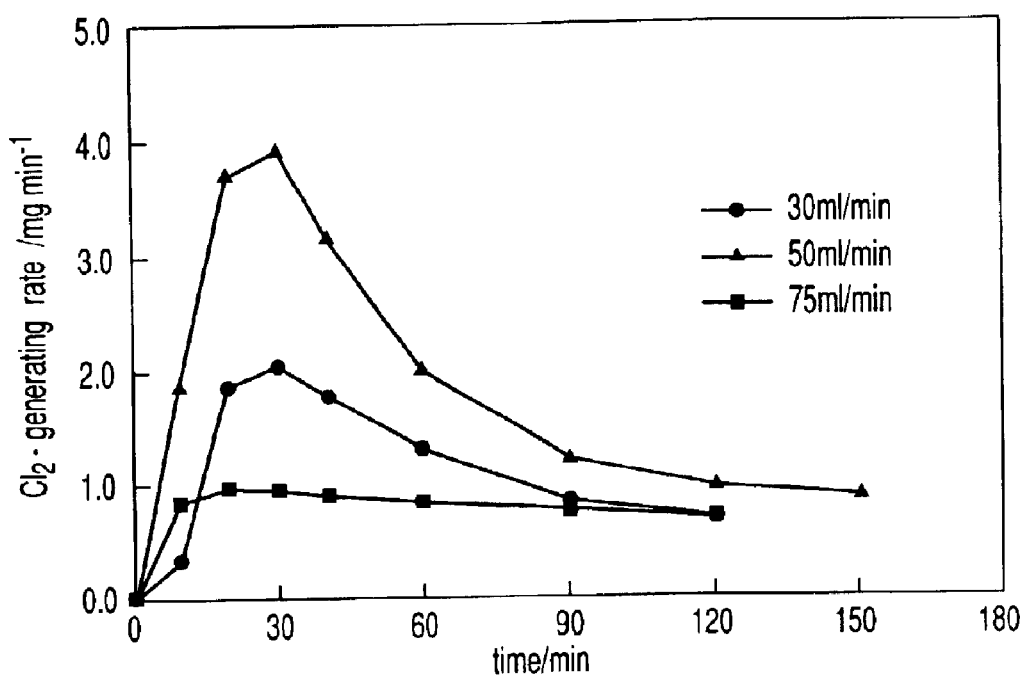
FIG. 7 is a graph illustrating the dependency of the quantity of chlorine gas generated per unit time on the flow rate of oxygen.
Figure 8:
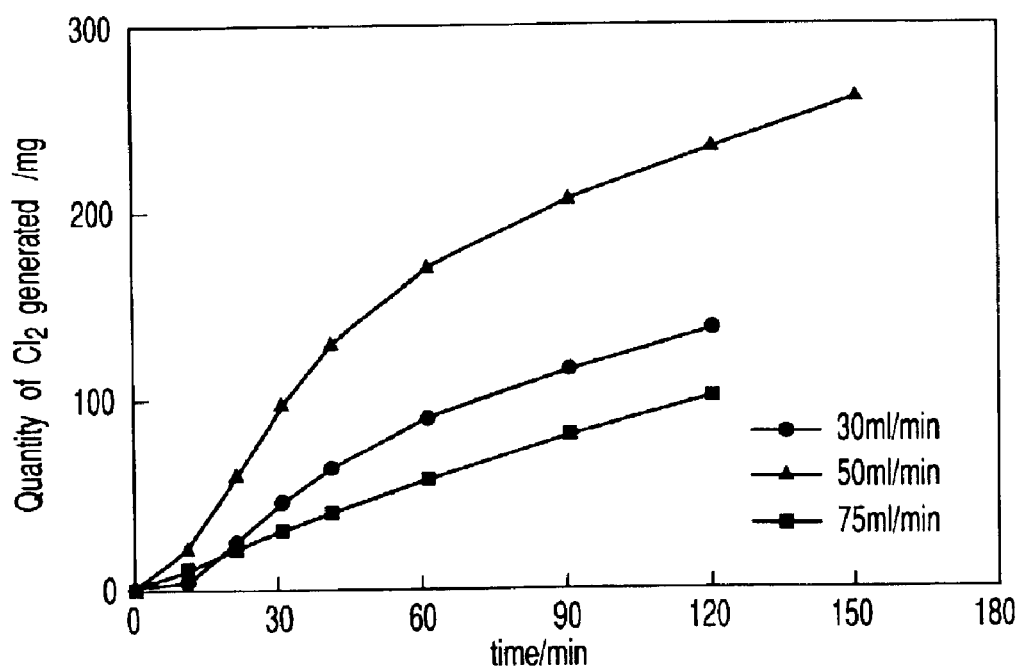
FIG. 8 is a graph illustrating the dependency of the total quantity of chlorine gas generated on the flow rate of oxygen.

The graph of FIG. 7 shows a quantity of chlorine gas generated per unit time, and the graph of FIG. 8 shows a total quantity of chlorine gas generated in this case. As seen from these graphs, in order to enable the rate of the generation of chlorine gas to become maximum, the flow rate of oxygen should be optimized. More specifically, when the flow rate of oxygen was 50 mL/min, the generation of chlorine gas was maximized.

The reason for this can be assumed to be explained as follows. The oxygen that had been blown into the fused salt of calcium chloride from the gas inlet tube was caused to become bubbles having a predetermined size in the fused salt. Depending on the size of the bubbles, the contacting state between oxygen and the fused salt of calcium chloride was caused to vary. Meanwhile, the size of the bubbles was caused to vary depending on the inner diameter of the gas inlet tube and on the flow rate of oxygen. Since the inner diameter of the gas inlet tube employed in this example was 6 mm, bubbles of optimum size was assumed to be formed when the flow rate of oxygen was set to 50 mL/min.

It was confirmed however that irrespective of the flow rate of oxygen, the quantity of chlorine gas generated was sharply reduced after 40 minutes of reaction period. The reason for this can be attributed, as explained above, to the fact that the fine particles of calcium oxide that had been generated from the reaction were allowed to float in the fused salt of calcium chloride to prevent the fused salt of calcium chloride from being contacted with oxygen.

EXAMPLE 4

In this example, in the same manner as in Example 2 except that the quantity of calcium chloride was increased to 3.0 g, calcium chloride was heated up to 900° C. to generate chlorine gas, the quantity of which was then measured by the same procedures as described above. In this case, the flow rate of oxygen gas was set to 50 mL/min.

The graph of FIG. 9 shows a quantity of chlorine gas generated per unit time, and the graph of FIG. 10 shows a total quantity of chlorine gas generated in this case. In each of these graphs, the results obtained when the 1.5 g of calcium chloride was employed were also shown. As seen from these graphs, irrespective of the quantity of calcium chloride employed, almost the same results were obtained. Namely, it was confirmed that the rate of generating chlorine gas by the reaction between the fused salt of calcium chloride and oxygen was not so much dependent on the quantity of calcium chloride employed.

EXAMPLE 5

In this example, in the same manner as in Example 3 except that the quantity of calcium chloride was increased to 3.0 g, calcium chloride was heated up to 900° C. to generate chlorine gas, which was then measured by the same procedures as described above. In this case, the oxygen gas was blown into the fused salt of calcium chloride at different flow rates, i.e. 30 mL/min, 50 mL/min and 75 mL/min.

Figure 11:
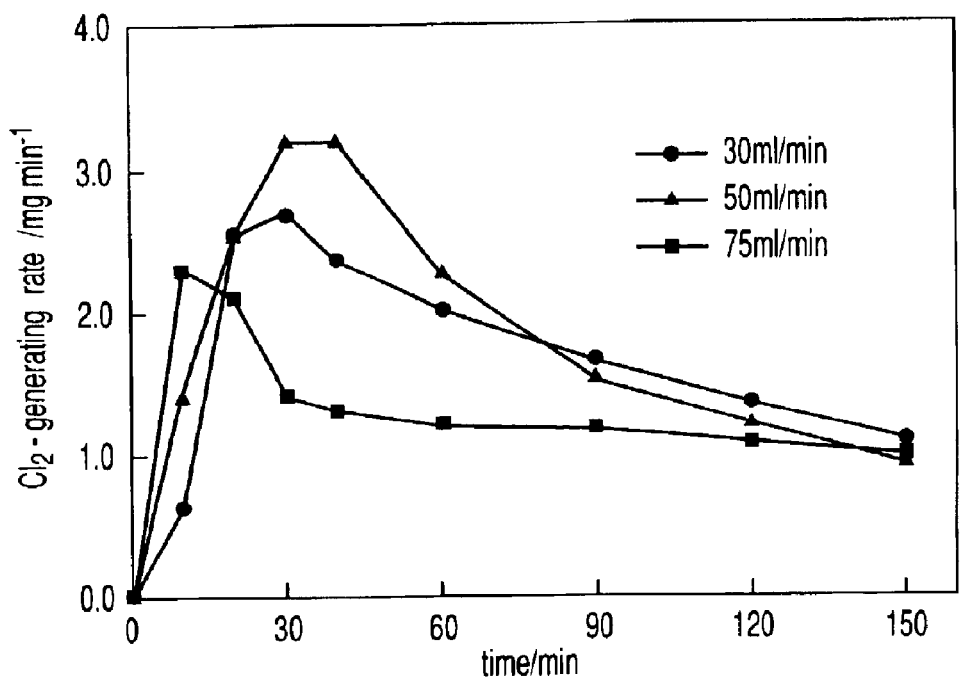
FIG. 11 is a graph illustrating the dependency of the quantity of chlorine gas generated per unit time on the flow rate of oxygen.
Figure 12:
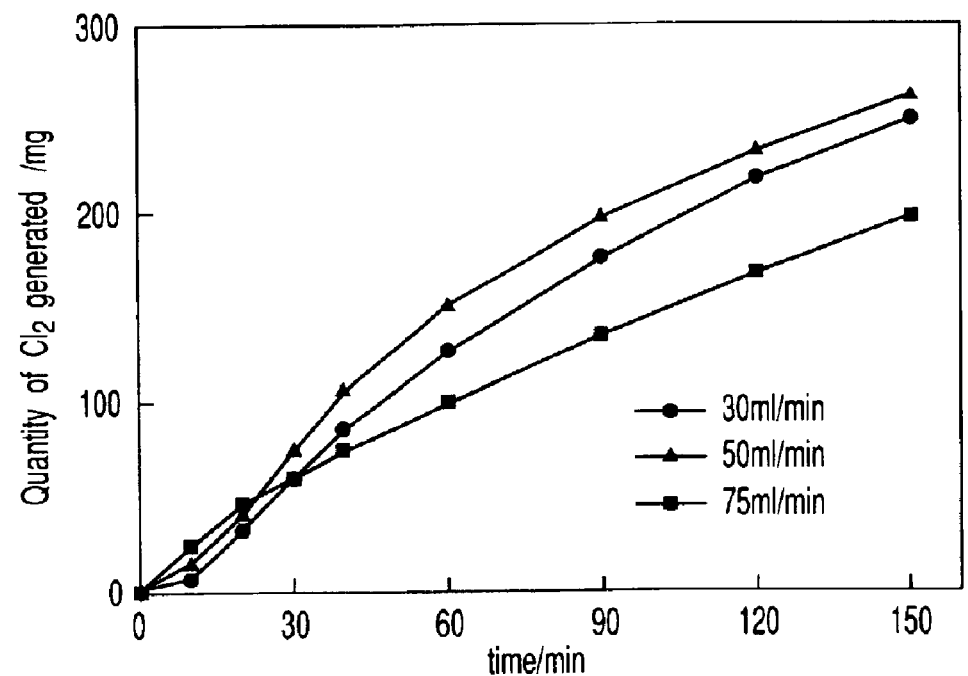
FIG. 12 is a graph illustrating the dependency of the total quantity of chlorine gas generated on the flow rate of oxygen.

The graph of FIG. 11 shows the quantity of chlorine gas generated per unit time, and the graph of FIG. 12 shows the total quantity of chlorine gas generated in this case. As seen from these graphs, the generation rate of chlorine gas where 3.0 g of calcium chloride was employed was maximized when the flow rate of oxygen was set to 50 mL/min. This result was the same as the results shown in the graphs of FIGS. 7 and 8 (the quantity of calcium chloride employed therein was 1.5 g). It was also confirmed from these results that in order to enable the rate of the generation of chlorine gas to become maximum, the flow rate of oxygen should be optimized.

Incidentally, the rate of generating chlorine gas where the flow rate of oxygen was set to 30 mL/min or 75 mL/min was found fairly different from that to be obtained when 1.5 g of calcium chloride was employed. It was assumed from this fact that the aforementioned conclusion that "the rate of generating chlorine gas to be produced from the reaction between the fused salt of calcium chloride and oxygen was not so much dependent on the quantity of calcium chloride employed" would be limited to the case where the flow rate of oxygen is optimized (50 mL/min) for obtaining a maximum chlorine gas-generating rate.

EXAMPLE 6

As shown in the aforementioned examples, even if oxygen was allowed to sufficiently contacted with the fused salt of calcium chloride by elongating the gas inlet tube, the chlorine gas-generating rate was caused to deteriorate after the lapse of certain period of reaction time. The reason for this was considered by the present inventors as follows. Namely, the fine particles of calcium oxide that had been generated from the reaction were allowed to float in the fused salt of calcium chloride to inhibit the reaction between the fused salt of calcium chloride and oxygen.

In order to solve this problem, a metal oxide powder which is capable of flocculating and separating floating particles of calcium oxide was added to the fused salt of calcium chloride, thereby making it possible to suppress the reaction-inhibiting factor originating from the fine particles of calcium oxide.

3.0 g of calcium chloride and 0.3 g of silica powder (the specific surface area thereof: 740 $m^2/g$) employed as metal oxide powder were introduced into the reaction tube 1 of the reactor shown in FIG. 2 and heated up to 200° C. in a He gas flow introduced therein at a flow rate of 50 mL/min. The resultant mixture was heated at this temperature for 30 minutes to remove water content in the sample. The resultant mixture was further heated up to 900° C., and after the confirmation of this temperature, the four-way cock was manipulated to switch the inlet gas from He to oxygen gas so as to allow chlorine gas to generate.

In this case, the flow rate of oxygen gas was set to 50 mL/min and the gas inlet tube 6 was elongated so as to enable the oxygen gas to be blown into the interior of the fused salt of calcium chloride.

Figure 13:
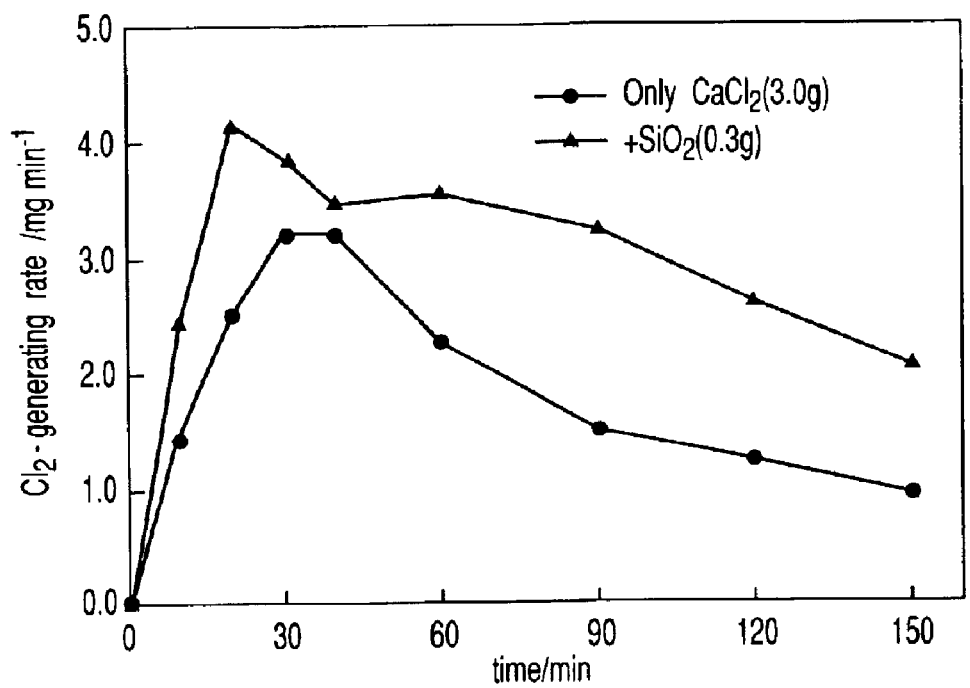
FIG. 13 is a graph illustrating the influence of silica powder added on the quantity of chlorine gas generated per unit time.
Figure 14:
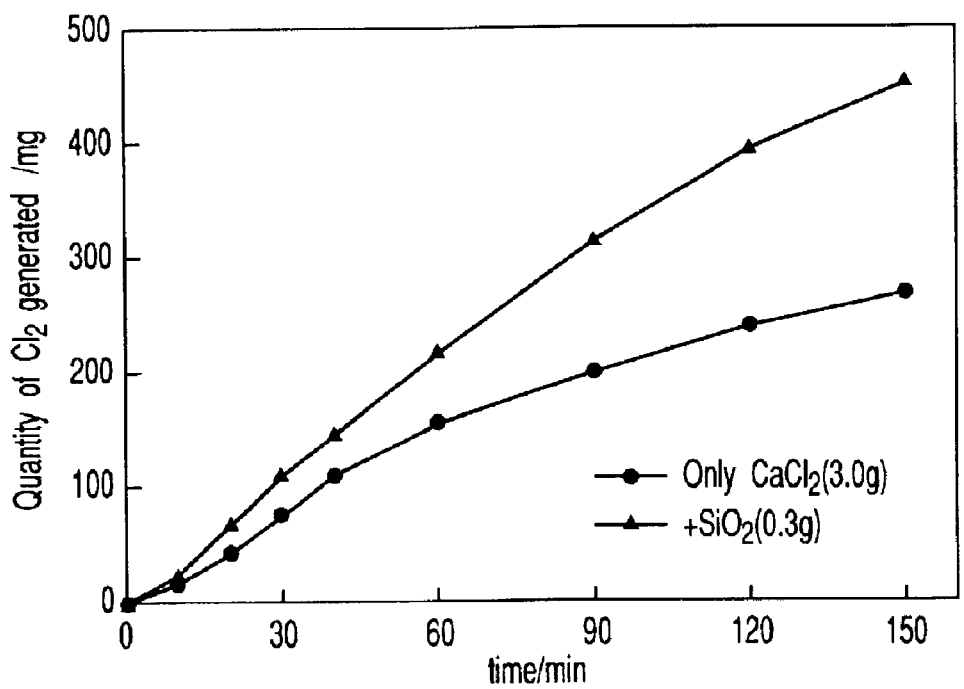
FIG. 14 is a graph illustrating the influence of silica powder added on the total quantity of chlorine gas generated.

A quantity of chlorine gas that was generated was measured in the same manner as described above. The graph of FIG. 13 shows a quantity of chlorine gas generated per unit time, and the graph of FIG. 14 shows a total quantity of chlorine gas generated in this case. These graphs also show the results obtained where the silica powder was not added thereto. It was confirmed from these graphs that it was possible, through the addition of silica powder, to not only promote the initial chlorine gas-generating rate but also prominently overcome the deterioration of the chlorine gas-generating rate that might have resulted from the lapse of the reaction period.

The quantity of silica powder to be added as metal oxide powder should preferably be 1/10 to 1/5 of the weight of calcium chloride. If the quantity of silica powder is less than the lower limit, it may become difficult to sufficiently secure the effects of flocculating and separating calcium oxide particles. On the other hand, if the quantity of silica powder is larger than the upper limit, the contact between the fused salt of calcium chloride and oxygen may deteriorate.

EXAMPLE 7

In this example, various kinds of silica power differing from each other in specific surface area were employed and the procedures were repeated in the same manner as in Example 6 to enable chlorine gas to be generate from 3.0 g of calcium chloride, and the quantity thereof was measured. In this case, three different specific surface areas of the silica powder were used, i.e. 300 $m^2/g$, 500 $m^2/g$ and 740 $m^2/g$.

Figure 15:
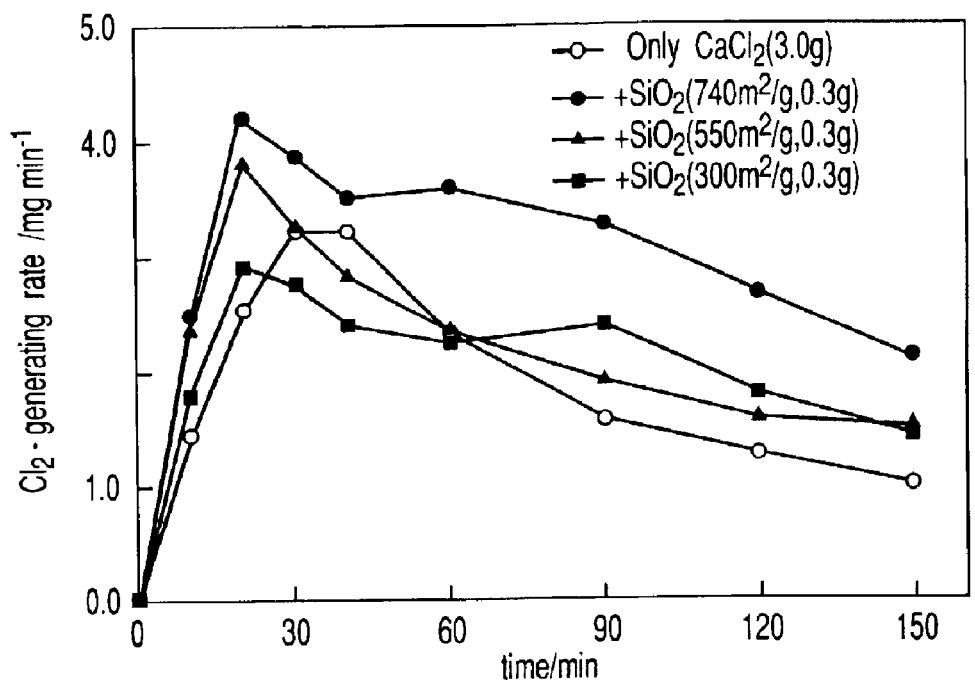
FIG. 15 is a graph illustrating the influence of the specific surface area of silica powder on the quantity of chlorine gas generated per unit time.
Figure 16:
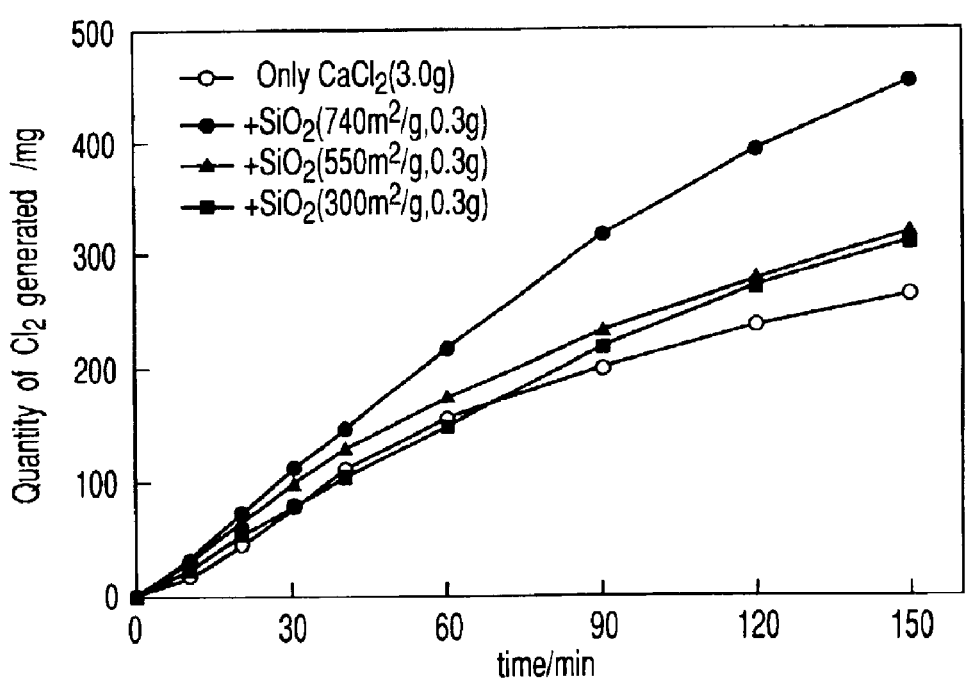
FIG. 16 is a graph illustrating the influence of the specific surface area of silica powder on the total quantity of chlorine gas generated.

The graph of FIG. 15 shows the quantity of chlorine gas generated per unit time, and the graph of FIG. 16 shows the total quantity of chlorine gas generated in this case. In these graphs, the results obtained where silica powder was not added thereto were also shown. As seen from these graphs, irrespective of the specific surface area of silica powder employed, it was possible to not only promote the initial chlorine gas-generating rate but also prominently overcome the deterioration of the chlorine gas-generating rate that might have been resulted from the lapse of reaction period. These effects became more prominent as the specific surface area of silica powder to be added thereto was increased.

Incidentally, silica powder having a specific surface area of less than 300 $m^2/g$ is disadvantageous as the flocculating efficiency per unit weight of silica powder would be deteriorated. Therefore, the specific surface area of silica powder should preferably be at least 300 $m^2/g$ in the employment thereof for flocculating and separating calcium oxide particles. As the specific surface area of silica powder is increased, the effects thereof for flocculating and separating calcium oxide particles would be further enhanced. However, when silica powder is too fine in size, the handling thereof would become difficult. In view of the effects of silica powder for flocculating and separating calcium oxide particles and in view of the easiness in handling the silica powder, the upper limit of the specific surface area of silica powder should preferably be about 1,000 $m^2/g$.

As explained above, it was confirmed that the efficiency of silica powder for flocculating and separating calcium oxide particles floating in the fused salt of calcium chloride depends largely on the physical properties of silica powder to be added, in particular, on the magnitude of the specific surface area thereof.

EXAMPLE 8

In this example, in the same manner as in Example 6 except that titania powder (the specific surface area thereof: 44 $m^2/g$) or alumina powder (the specific surface area thereof: 186 $m^2/g$) were substituted for the silica powder, 3.0 g of calcium chloride was heated up to 900° C. to generate chlorine gas, the quantity of which was then measured by the same procedures as described above.

Figure 17:
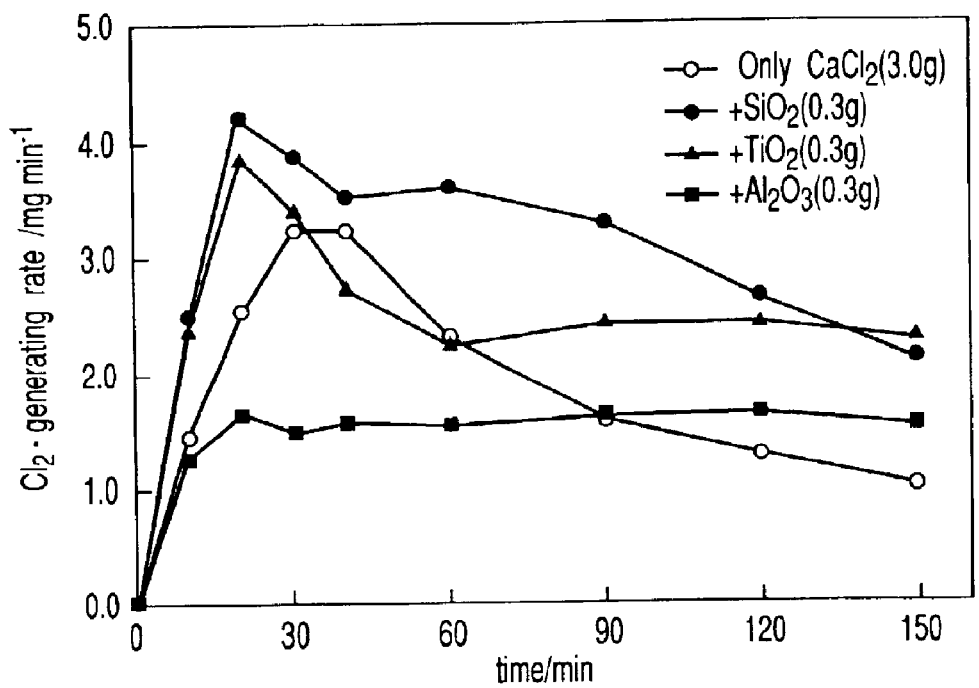
FIG. 17 is a graph illustrating the influence of the kind of metal oxide powder on the quantity of chlorine gas generated per unit time.
Figure 18:
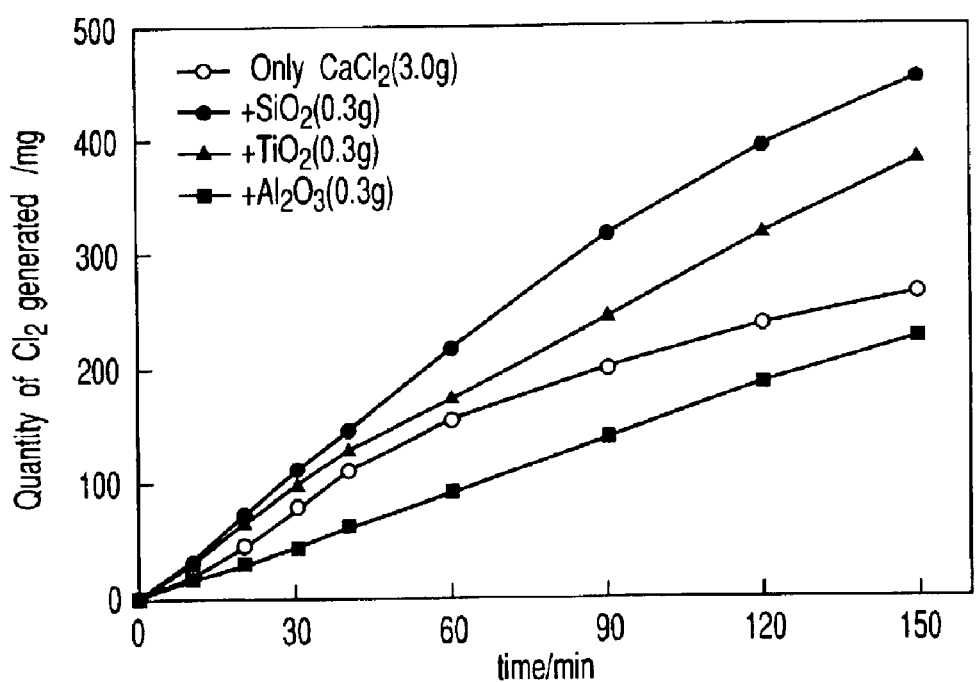
FIG. 18 is a graph illustrating the influence of the kind of metal oxide powder on the total quantity of chlorine gas generated.

The graph of FIG. 17 shows a quantity of chlorine gas generated per unit time, and the graph of FIG. 18 shows a total quantity of chlorine gas generated in this case. In each of these graphs, the results obtained when silica powder (the specific surface area thereof: 740 $m^2/g$) was employed were also shown. As seen from these graphs, when the titania powder was added, it was possible to inhibit the deterioration of the initial chlorine gas-generating rate or the deterioration of the chlorine gas-generating rate resulting from the lapse of the reaction. On the other hand, in the case of the alumina powder, no effects of adding the alumina powder were recognized, and the total quantity of generated chlorine gas was reduced.

It was confirmed from the results of this example that not only silica powder but also titania powder could be employed as a metal oxide powder for flocculating and separating calcium oxide particles.

EXAMPLE 9

In this example, in the same manner as in Example 6 except that two kinds of titania powder differing in specific surface area from each other were substituted for the silica powder, 3.0 g of calcium chloride was heated to generate chlorine gas, the quantity of which was then measured. In this case, two different specific surface areas of the titania powder were used, i.e. 1.6 $m^2/g$ and 44 $m^2/g$.

Figure 19:
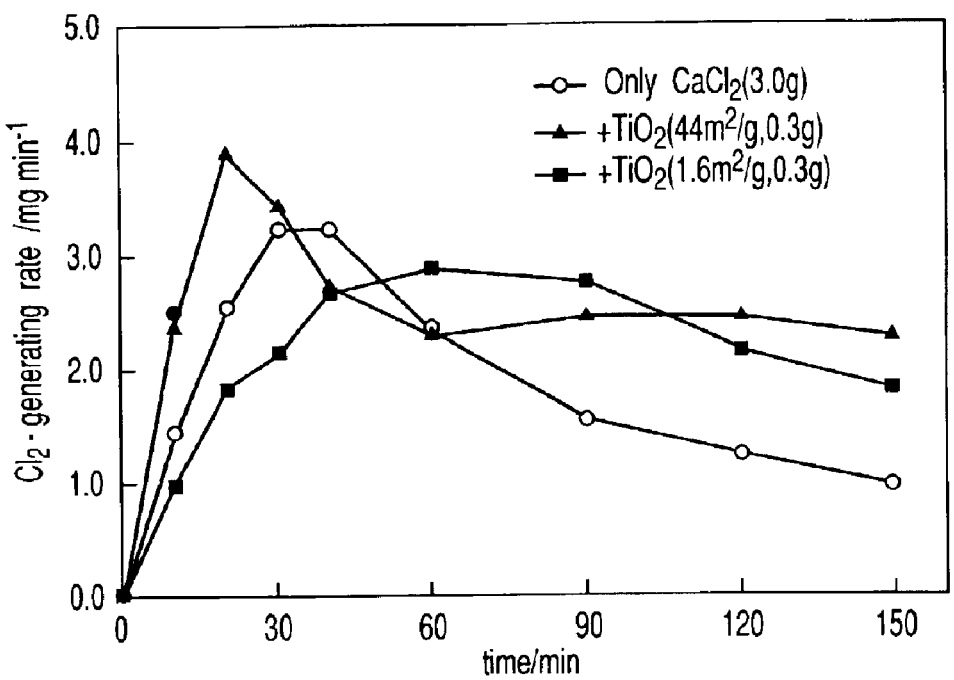
FIG. 19 is a graph illustrating the influence of the specific surface area of titania powder on the quantity of chlorine gas generated per unit time.
Figure 20:
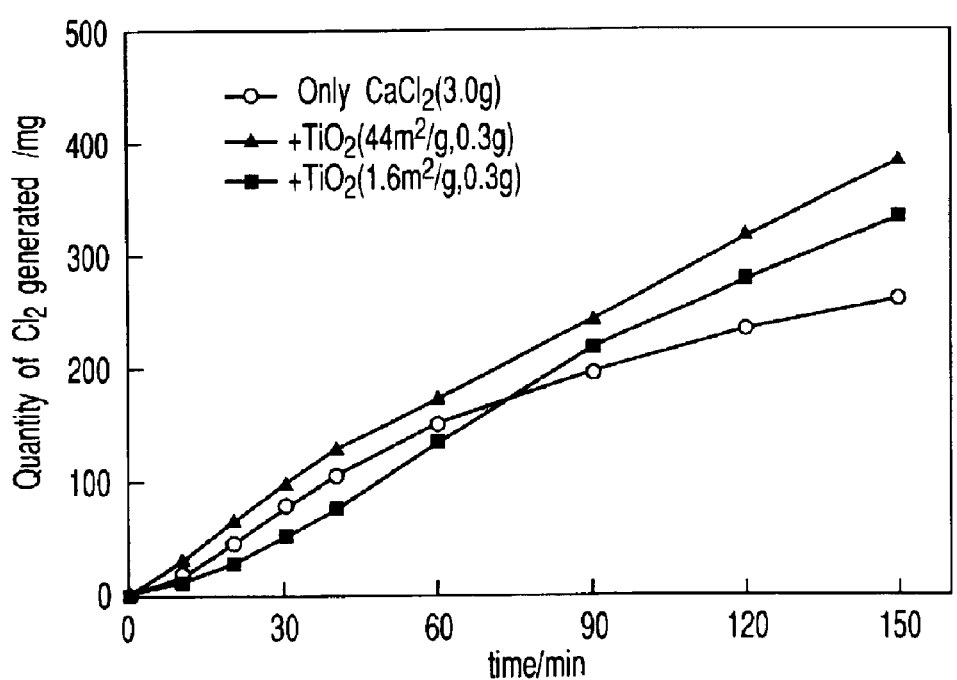
FIG. 20 is a graph illustrating the influence of the specific surface area of titania powder on the total quantity of chlorine gas generated.

The graph of FIG. 19 shows the quantity of chlorine gas generated per unit time, and the graph of FIG. 20 shows the total quantity of chlorine gas generated in this case. In each of these graphs, the results obtained when titania powder was not employed are also shown. As can be seen from these graphs, irrespective of the specific surface area of the titania powder, it was possible to promote the initial chlorine gas-generating rate and inhibit the deterioration of the chlorine gas-generating rate resulting from the lapse of the reaction. These effects became more prominent as the specific surface area of titania powder to be added was increased.

Incidentally, titania powder having a specific surface area of less than 1.6 $m^2/g$ is disadvantageous as the flocculating efficiency per unit weight of titania powder would be deteriorated. Therefore, the specific surface area of titania powder should preferably be at least 1.6 $m^2/g$ in the employment thereof for flocculating and separating calcium oxide particles. As in the case of silica powder, as the specific surface area of titania powder is increased, the effects thereof for flocculating and separating calcium oxide particles would be further enhanced. However, when titania powder is too fine in size, the handling thereof would become difficult. In view of the effects of titania powder for flocculating and separating calcium oxide particles and in view of the easiness in handling the silica powder, the upper limit of the specific surface area of titania powder should preferably be about 50 $m^2/g$.

As explained above, it was confirmed that the efficiency of titania powder for flocculating and separating calcium oxide particles floating in the fused salt of calcium chloride depends largely on the physical properties of titania powder to be added, in particular, on the magnitude of the specific surface area thereof.

EXAMPLE 10

In this example, the size and number of the bubbles of oxygen gas to be blown into the fused salt of calcium chloride were varied. Specifically, in the same manner as in Example 4 except that a quartz tube provided with five holes 2 to 3 mm in inner diameter at the spherical bottom thereof was substituted for the quartz tube having an inner diameter of 6 mm, 3.0 g of calcium chloride was heated to generate chlorine gas, the quantity of which was then measured.

The graph of FIG. 21 shows a quantity of chlorine gas generated per unit time, and the graph of FIG. 22 shows a total quantity of chlorine gas generated in this case. In each of these graphs, the results obtained when the quartz tube having an inner diameter of 6 mm was employed were also shown for the purpose of comparison. As seen from these graphs of FIGS. 21 and 22, when the flow rate of oxygen gas was set to 50 mL/min, the chlorine gas-generating reaction was not substantially affected by the size and number of the bubbles of oxygen gas to be blown into the fused salt of calcium chloride.

Incidentally, the graphs of FIGS. 21 and 22 also show the results obtained from the case where a quartz tube provided with ten holes 2 to 3 mm in inner diameter was employed. In contrast to the case where the quartz tube was provided with five holes having the same inner diameter as described above, when the quartz tube was provided with ten holes in this manner, the efficiency of generating chlorine gas was deteriorated. The reason for this can be assumed to be as follows. Namely, when it is assumed that oxygen gas is introduced into the quartz tube at a constant flow rate, as the number of holes in the quartz tube is increased, the velocity of the oxygen gas bubbles blown into the fused salt of calcium chloride decreases. As a result, the effect of agitating the fused salt of calcium chloride deteriorates, thereby inhibiting the fused salt of calcium chloride from contacting the oxygen gas. Therefore, the optimum number of holes in the quartz tube depends on the flow rate of oxygen gas, so that there is an optimum relationship between the number of holes and the flow rate of oxygen gas.

EXAMPLE 11

In the same manner as in Example 10 except that the flow rate of oxygen gas was altered to 100 mL/min and to 150 mL/min, by using a quartz tube with five holes 2 to 3 mm in inner diameter at the spherical bottom thereof, 3.0 g of calcium chloride was heated to generate chlorine gas, the quantity of which was then measured.

The graph of FIG. 23 shows a quantity of chlorine gas generated per unit time, and the graph of FIG. 24 shows a total quantity of chlorine gas generated in this case. In each of these graphs, the results obtained when the flow rate of oxygen gas was set to 50 mL/min. As seen from FIG. 23, although the initial rate of generating chlorine gas was increased in proportion to the increase of the flow rate of oxygen gas, the rate of generating chlorine gas was suppressed as the production of calcium oxide was increased. Further, it is clear from FIG. 24 that there is an optimum value for the flow rate of oxygen gas to be introduced therein in order to make maximum a total quantity of chlorine gas to be generated. In the case where the quartz tube was provided with five holes, a total quantity of chlorine gas to be generated was made maximum when the flow rate of oxygen gas was set to 100 mL/min. In this case, the quantity of chlorine gas generated was about 1.8 times as high as that where a quartz tube having an inner diameter of 6 mm (oxygen gas flow rate: 50 mL/min) was employed.

It was confirmed from these results that in order to make maximum a total quantity of chlorine gas to be generated, the size of oxygen gas bubbles to be generated inside the fused salt of calcium chloride should be suitably controlled. This can be realized by suitably selecting an optimum combination between the number of holes to be formed at the bottom of the quartz tube and the oxygen gas flow rate (supply flow rate).

As explained above, it is possible, according to the embodiments of the present invention, to provide a suitable method of recovering chlorine gas from calcium chloride.

According to the method proposed by the present invention, calcium oxide can be recovered together with chlorine gas from calcium chloride, so that chlorine gas can be utilized as an industrial resource for the manufacture of polyvinyl chloride, while calcium oxide can be recycled as slaked lime for immobilizing chlorine gas. Therefore, it is now possible to formulate a material-recycling system with respect to chlorine included in polyvinyl chloride, thus rendering this method valuable in industrial viewpoint.

Additional advantages and modifications will readily occur to those skilled in the art. Therefore, the invention is its broader aspects is not limited to the specific details and representative embodiments shown and described herein. Accordingly, various modifications may be made without departing from the spirit or scope of the general inventive concept as defined by the appended claims and their equivalents.

What is claimed is:

1. A method of recovering chlorine gas from calcium chloride comprising:
   introducing calcium chloride into a heat-resistant vessel which is provided with a gas inlet pipe and a gas outlet pipe;
   heating the calcium chloride up to a temperature not lower than a melting point thereof while introducing an inert gas through said gas inlet pipe into said vessel to produce fused salt of calcium chloride; and
   heating an interior of said vessel up to 1073K or more and switching the gas being introduced through said gas inlet pipe from said inert gas to oxygen to allow said fused salt of calcium chloride to react with the oxygen to obtain chlorine gas and calcium oxide, said chlorine gas being subsequently rapidly and continuously discharged from said vessel through said gas outlet pipe.

2. The method according to claim 1, wherein said oxygen is blown into an interior of said fused salt of calcium chloride.

3. The method according to claim 1, wherein said oxygen is introduced into said vessel at a flow rate ranging from 30 mL/min to 75 mL/min.

4. The method according to claim 2, said reaction between oxygen and said fused salt of calcium chloride is performed at a temperature lower than a melting point of said calcium oxide.

5. The method according to claim 1, wherein a reaction between oxygen and said fused salt of calcium chloride is performed in a presence of metal oxide powder.

6. The method according to claim 5, wherein said metal oxide powder is added at a ratio ranging from 1/10 to 1/5 by weight of said calcium chloride.

7. The method according to claim 5, wherein said metal oxide powder contains at least one kind of material selected from the group consisting of silica powder and titania powder.

8. The method according to claim 7, wherein said metal oxide powder contains silica powder having a specific surface area of 300 $m^2/g$ or more.

9. The method according to claim 7, wherein said metal oxide powder contains titania powder having a specific surface area of 1.6 $m^2/g$ or more.

10. The method according to claim 2, wherein said calcium chloride employed is obtained by spraying an exhaust gas from an incinerator with a slurry-like aqueous solution of calcium hydroxide or with calcium oxide fine powder.

* * * * *